Patented May 10, 1938

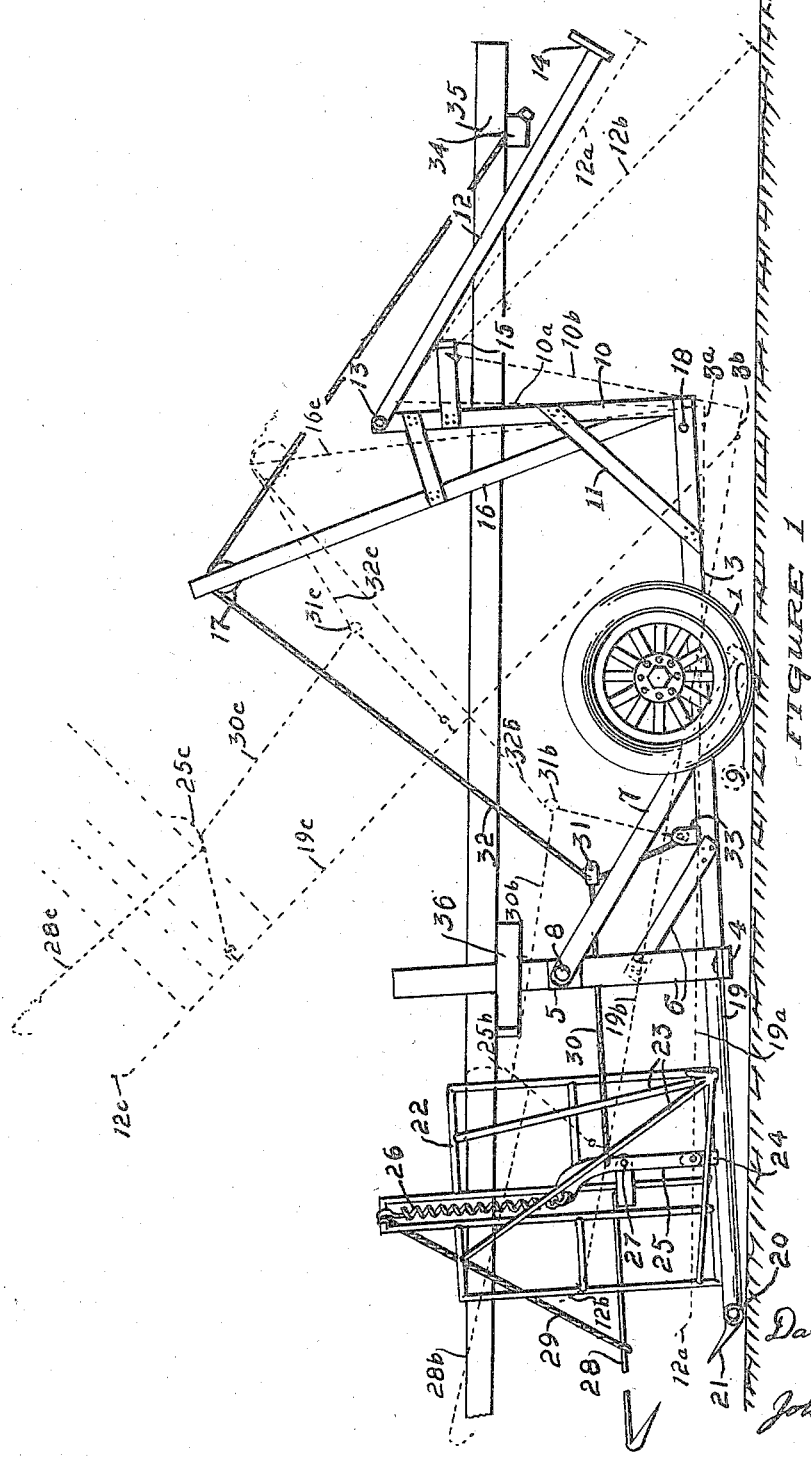

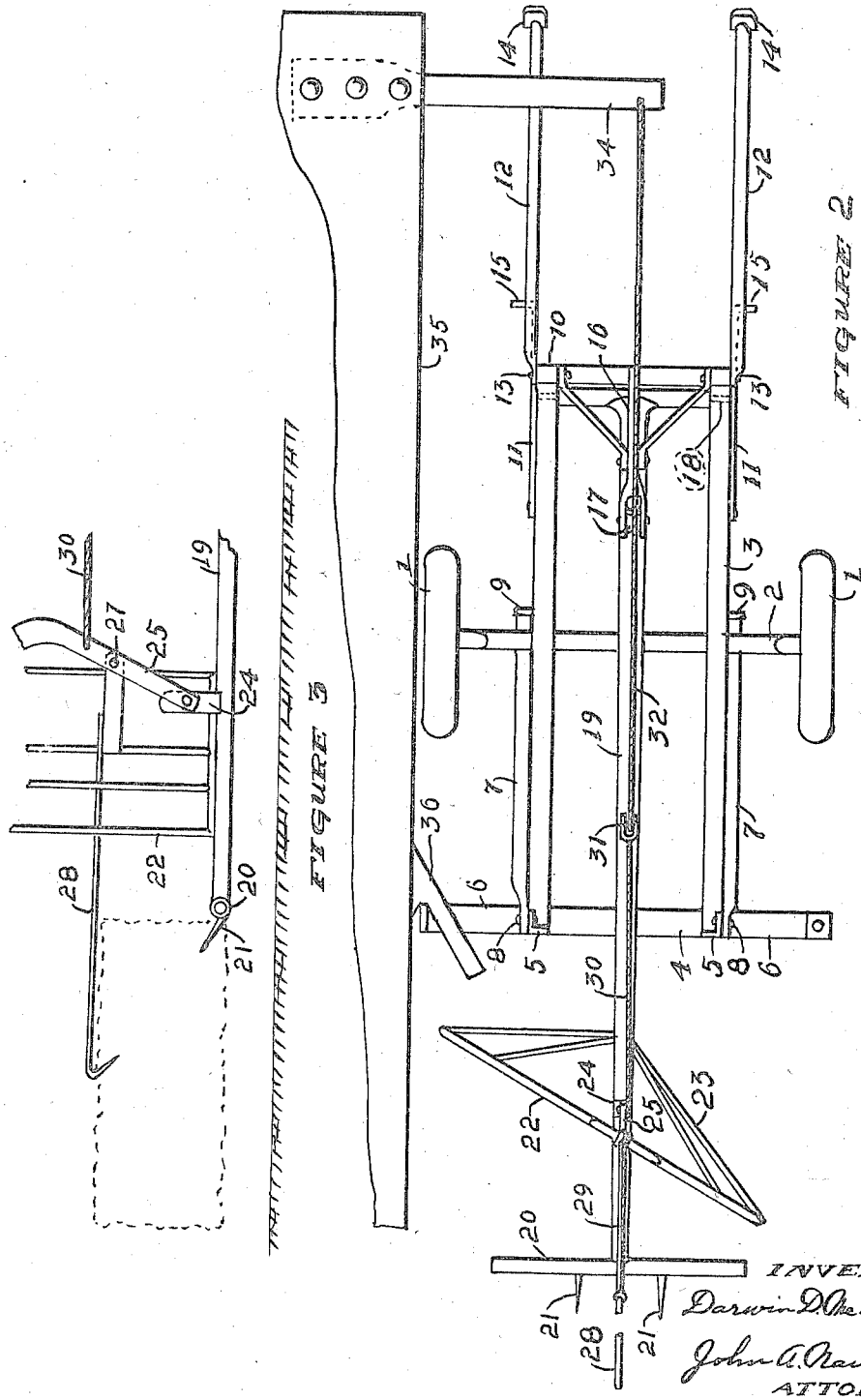

2,116,728

UNITED STATES PATENT OFFICE 2,116,728

TRUCK LOADER

Darwin D. McDermott, San Jose, Calif.

Application February 20, 1937, Serial No. 126,862

5 Claims. (Cl. 214—81)

One object of the present invention is to provide mechanical means operable to lift heavy loads such as baled hay, alfalfa and the like, sacked grain and the like, and deposit the same on a cooperating truck.

It is another object of the invention to provide a device of the character indicated that may be removably attached to a truck and operated by movement of the truck relative to the body of the device.

It is also an object of the invention to provide a device of the character indicated that is so constructed and arranged that it will automatically grasp and hold a load when moved into engagement therewith.

It is still another object of the invention to provide a device of the character indicated that will be economical to manufacture, simple in form and construction, strong, durable, and highly efficient in its practical application.

In the drawings:

Figure 1 is a side elevation of a machine embodying my invention.

Figure 2 is a plan view of the same.

Figure 3 is a detail side elevation of a portion of the machine in operative engagement with a bale.

The particular embodiment of the invention herein disclosed comprises a pair of wheels 1—1 journaled on an axle 2 which supports a bed-frame 3.

A cross-bar 4 is mounted upon and forms a part of the front end of the frame and extends beyond the sides thereof.

At 5—5 are two uprights mounted on the front corners of the frame and supported by brackets as 6.

On the upper ends of members 6 are pivotally mounted legs 7 as at 8. These legs are provided with feet as 9 and are inclined downwardly and rearwardly from the members 6 as shown so as to engage the ground instantly and raise the front end of the frame if force is applied to the frame to move it rearwardly as hereinafter described.

Upon the rear end corners of the frame are mounted uprights as 10 braced as at 11 and having legs 12 pivotally mounted thereon as at 13. These legs 12 are provided with feet as 14 and are normally supported in a raised angular position to uprights 10 by means of arms 15. Also mounted rigidly on the frame 3 is a support 16 for a pulley 17, this support being mounted at the foot of members 10 and inclined upwardly and forwardly therefrom.

Pivotally mounted on the rear end of frame 3 as at 18 is a hoisting beam 19 having a cross-bar 20 on its free end, this bar being provided with prongs as 21. Beam 19 extends forwardly of the frame 3 so that the bar 20 will ride or glide along the ground in a position for the prongs 21 to engage a bale, as clearly shown in Figure 1.

Since it is one function of the device to not only pick the load up but to actually deposit it on a truck, a platform 22 is rigidly mounted upon the beam 19 and braced as at 23. This platform in the present instance is merely a frame provided with cross-members and arranged in a plane angularly disposed relative to the plane in which the beam operates as clearly shown in Figure 2.

To deposit the load upon the platform the following mechanism is provided. Upon an upstanding spur 24 mounted on beam 19 adjacent frame 22 is a lever 25, this lever being normally supported in an upright position by means of a spring 26 connected to the upper end thereof and to the top of the frame 22. Pivotally mounted on the lever 25 as at 27 is a grab hook 28, the hook 28 being supported in an elevated position relative to prongs 21 by means of a cable 29 attached to the hook and to the top of frame 22.

Connected to the lever 25 above the pivotal connection 27 is a cable 30, to the other end of which is attached a pulley 31. At 32 is shown another cable attached to the beam 19 at 33 and passing over the pulley 31 and also the pulley 17 to a connection of any suitable type, as 34, on the truck 35 in connection with which the device is to be used.

Assuming now that the device is connected to a truck in such a manner that it will move forwardly as a unitary part of the truck and on one side thereof but will remain stationary when the truck is moved backwardly relative thereto, as indicated at 36, its operation is as follows.

The several parts naturally fall into the positions shown in solid lines in Figure 1, and consequently when the truck is moved forwardly the prongs 21 will engage the bale lying in the path of the device, while the hook 28 will slide over the top thereof, the cable 29 holding it high enough to function in this manner, and the lever 25 permitting it to follow the contour of the top of the bale. If the truck is now backed up the legs 7 immediately engage the ground and operate to raise the front end of the frame 3 and with it the beam 19 and its load. Since the rearward pull is applied through the medium of the cable 32 it follows that the initial rearward movement causes the hook 28 to sink into the bale to be raised, the hook and its cooperating parts then assuming the positions shown in Figure 3. In this figure the bale is raised off of the ground, the frame 3 taking the position indicated in dotted lines at 3a, Figure 1.

The continued backward movement of the truck with the power applied as described causes the legs 7 to raise the front end of the frame 3 and the load into the position 3b, in which position the legs 12 engage the ground as at 12b and further movement of the frame 3 is completely stopped.

As the truck continues to move rearwardly the beam 19 is moved upwardly through a vertical arc and about its pivotal mounting 18. When it is elevated to some such position as indicated in dotted lines at 19c the bale will fall back upon the frame or platform 22 which, being inclined toward the truck, causes the bale to slide in that direction and on to the truck.

When the truck moves forwardly again the several parts assume their original positions and the device is moved forwardly to engage another bale. While prongs 21 and hook 28 are described as forming a grab it is clear that such devices can be used only when loading bales or similar objects. If the device is to be used for loading bags of material, such as sacked grain, then non-puncturing cross-heads would be substituted for the prongs and hook.

It is to be understood of course, that while I have herein shown and described but one specific example of my invention, changes in form, construction, and method of assembly and operation may be made within the scope of the appended claims.

I claim:

1. A truck loading device comprising, a pair of wheels, a supporting frame journaled thereon intermediate its length, ground engaging means pivotally associated with the frame forwardly of the wheels and projecting rearwardly of the frame to prevent movement thereof in that direction, a hoisting beam pivotally mounted on the rearward portion of the frame and extending forwardly thereof and overlying the same, load engaging means associated with the free end of the beam, a grab member associated with the free end of the beam and overlying the said load engaging means, and truck actuated means constructed and arranged to first move the grab member into engagement with a load and then to move the beam and its load upwardly against the resistance of the ground engaging means.

2. In a truck loading device, a pair of wheels, a supporting frame journaled thereon intermediate its length, ground engaging means pivotally mounted on the forward portion of the frame and extending rearwardly therefrom, whereby urging the frame rearwardly will operate to swing the front end of the frame upwardly, upstanding supporting means mounted on the rear portion of the frame, rearwardly directed legs pivotally mounted on said supporting means, said legs being normally supported out of engagement with the ground but moved into engagement therewith by the tilting of the frame on the first mentioned ground engaging means.

3. In a truck loading device, a supporting frame, a hoisting beam pivotally mounted thereon to swing in a vertical plane and having a grab member on its free end, an upstanding platform mounted on the beam adjacent its free end and laterally and rearwardly inclined with respect thereto, and a second grab member associated with the beam and platform and overlying the first grab member, and means constructed and arranged to first move the second grab member into engagement with a load and then to swing the beam upwardly until the load falls upon the platform and thence to the truck.

4. In a truck loading device, a supporting frame, a hoisting beam pivotally mounted thereon to swing in a vertical plane and having a grab member on its free end, an upstanding platform mounted on the beam adjacent its free end and laterally inclined with respect thereto, an upstanding lever mounted on the beam, a second grab member pivotally mounted on the lever to overlie the first grab member, means operative to normally support the lever in an upright position, and means connected to the lever whereby to move the second grab member into engagement with a load on the first grab member and then swing the beam upwardly until the load falls upon the platform and thence to the truck.

5. In a truck loading device, the combination with a hoisting beam, of a grab comprising a load engaging grab member disposed on the forward end of the beam, an upstanding lever pivotally associated with the beam, a load engaging grab member pivotally associated with the lever to overlie the first grab member, means connected to the lever operative to move the second grab member into engagement with the load, and a load receiving platform mounted on the beam between the grab members and lever.

DARWIN D. McDERMOTT.